(12) United States Patent
Leino

(10) Patent No.: US 7,175,759 B2
(45) Date of Patent: Feb. 13, 2007

(54) APPARATUS AND A METHOD FOR CONTROLLING THE ALKALINITY AND PH OF AN INDUSTRIAL PROCESS

(75) Inventor: Hannu Leino, Espoo (FI)

(73) Assignee: Linde Aktiengesellschaft, Wiesbaden (DE)

( * ) Notice: Subject to any disclaimer, the term of this patent is extended or adjusted under 35 U.S.C. 154(b) by 332 days.

(21) Appl. No.: 10/488,183

(22) PCT Filed: Dec. 12, 2002

(86) PCT No.: PCT/FI02/01012

§ 371 (c)(1),
(2), (4) Date: Mar. 1, 2004

(87) PCT Pub. No.: WO03/050356

PCT Pub. Date: Jun. 19, 2003

(65) Prior Publication Data

US 2004/0238455 A1    Dec. 2, 2004

(30) Foreign Application Priority Data

Dec. 12, 2001 (FI) ................................. 20012442

(51) Int. Cl.
*C02F 1/00* (2006.01)
(52) U.S. Cl. ..................... 210/101; 210/205; 210/251; 422/105

(58) Field of Classification Search ................ 210/101, 210/205, 206, 251, 210; 422/105
See application file for complete search history.

(56) References Cited

U.S. PATENT DOCUMENTS 4,277,343 A    7/1981    Paz

FOREIGN PATENT DOCUMENTS

| EP | 0281273 B1 | 9/1988 |
| GB | 2031148 A * | 4/1980 |
| WO | WO98/56988 | 12/1998 |

* cited by examiner

*Primary Examiner*—Robert A. Hopkins
(74) *Attorney, Agent, or Firm*—Browdy and Neimark, PLLC

(57) ABSTRACT

The present invention relates to an apparatus and a method for controlling the alkalinity and the pH of an industrial process. The apparatus is adapted for being located outside a main process stream of the industrial process. The apparatus includes inlet means (2, 3, 4) for a basic substance, an acidic substance and water, control means (6) for said inlet means (2, 3, 4), a reactor (1) for reacting the basic substance, the acidic substance and the water for providing a predefined alkalinity and pH in the resulting aqueous buffering mixture, and outlet means (9) for supplying said buffering mixture to the main process stream for controlling the alkalinity and the pH of the industrial process.

36 Claims, 2 Drawing Sheets

Figure 1:
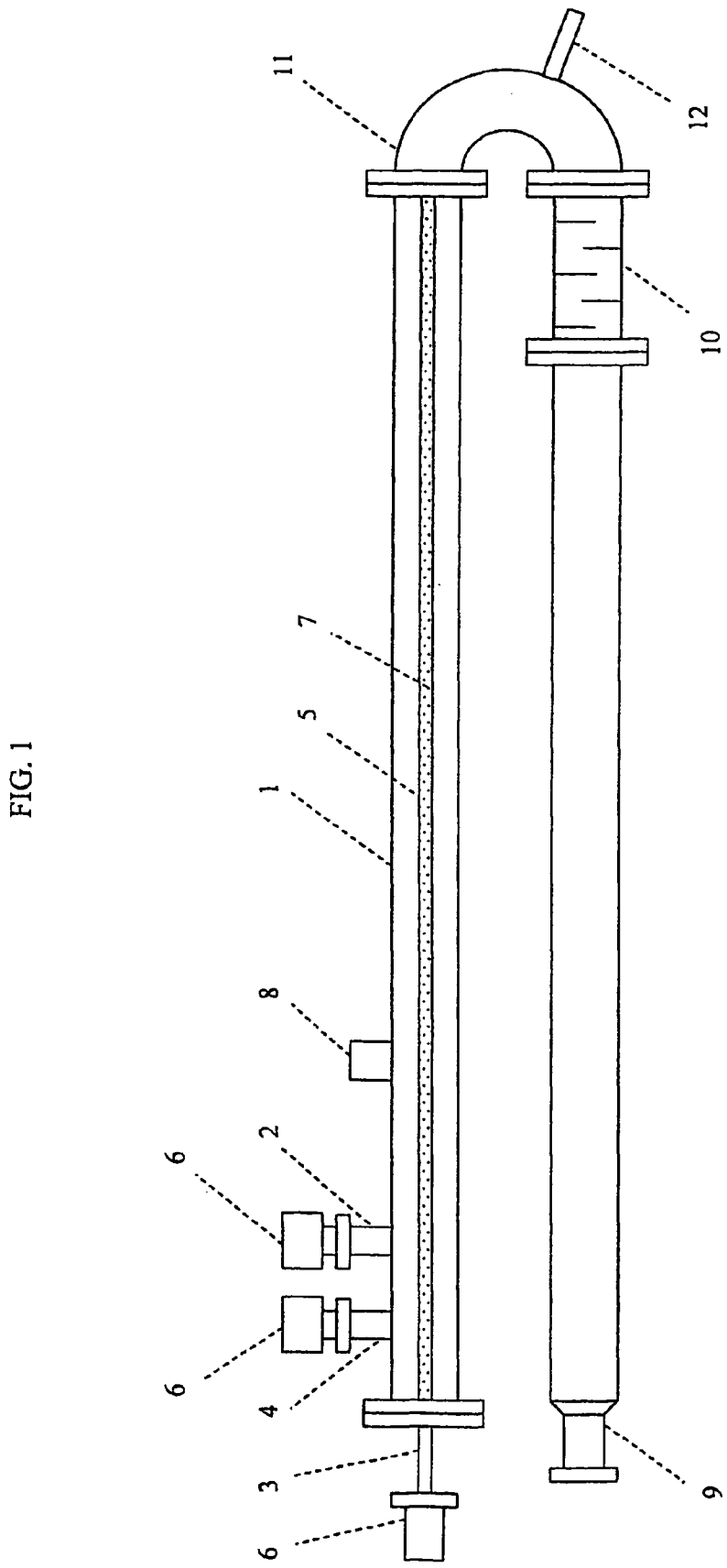

APPARATUS AND A METHOD FOR CONTROLLING THE ALKALINITY AND PH OF AN INDUSTRIAL PROCESS

The present invention relates to an apparatus and a method for controlling the alkalinity and pH of an industrial process.

Alkalinity is a measure of the buffering capacity of an aqueous system, i.e. the capacity to prevent pH changes. It can also be seen as a capacity to accept $H^+$ or $OH^-$ ions. The buffering capacity enables the addition of acidic and basic substances to an aqueous system without significant changes in the pH. The amounts of bases and acids that can be added without affecting the pH depend on the strength and amount of the base and the acid as well as on the amount of alkalinity. Many industrial processes lack a sufficient alkalinity required for operating properly.

A high alkalinity prevents harmful pH variations caused by addition of raw materials having different pH values. pH changes may cause e.g. unwanted precipitations and dissolutions in an industrial process.

Generally alkalinity results from the amounts of hydroxide, carbonate and bicarbonate ions in an aqueous solution according to the equation: $[alk]=[OH^-]+2[CO_3^{2-}]+[HCO^{3-}]-[H^+]$. Alkalinity may also result from ammonia and the conjugate bases of phosphoric, silicic, boric and organic acids.

Alkalinity may be expressed as M-alkalinity or P-alkalinity depending on the determination used for the assay. M-alkalinity is determined by titration with acid to the methyl orange endpoint (pH 4.5) and M-alkalinity results mainly from the concentration of bicarbonate ions. P-alkalinity is determined by titration with acid to the phenolphthalein endpoint (pH 8.3) and P-alkalinity results from the concentrations of hydroxide and carbonate ions. Alkalinity is often expressed in units of mg/l of $CaCO_3$ or mmol/l of $CaCO_3$.

Alkalinity is not to be confused with pH, which is a measure of the concentration of $H^+$ ions ($pH=-\log [H^+]$).

In case the aqueous system of an industrial process does not have a sufficient buffering capacity the pH control and adjustment may be difficult. The amounts of acidic and basic substances which will be added have to be very carefully measured. Especially if strong acids or bases are used any over-dosage will easily cause too big pH changes.

Adequate alkalinity is especially advantageous e.g. in processes for making pulp or paper as well as in water treatment processes.

In the production of chemical pulp, a pulp suspension for producing paper or pulp is generally produced in a so called fiber plant by cooking, bleaching, extracting and/or washing operations, wherein the pH is substantially changed between unit operations and wherein a high alkalinity is generally not desirable. Papermaking pulp may also be produced from recycled paper. When the pulp has been treated and is ready for being processed into sheets of pulp or paper, the pulp enters the paper mill. Such a pulp is called herein a papermaking pulp to distinguish it from the pulp in the fiber plant. In the subsequent treatment the papermaking pulp is subjected to dilutions with water and to various fine adjustments with chemicals. Papermaking pulp can also be produced from chips by refining or grinding. Such a papermaking pulp is called mechanical pulp.

A papermaking pulp suspension has a low inherent buffering capacity. A higher alkalinity in the pulp suspension would be advantageous since many chemical additions and treatments which affect the pH are effected during the papermaking process. pH fluctuation on the other hand may cause various problems in the process, like in the refining.

A high alkalinity is advantageous in the papermaking e.g. if the papermaking pulp is acidic when entering the stock preparation and the short circulation is run at a neutral or alkaline pH or slightly acidic. The pH is traditionally raised and controlled at need by adding sodium hydroxide, NaOH. NaOH is, however, a very strong base, which means that only small amounts are needed for pH adjustments, the NaOH also has to be diluted before addition. The paper maker could end up in a situation with varying pH of the entering pulp, which has a negative impact on paper quality and paper machine runnability.

A paper making pulp wherein the fibers have been treated and are ready for being used to produce paper is called stock. Through the stock preparation and the long and short circulation of the paper plant a number of paper chemicals and dilution waters are added, some of which are acidic and therefore decrease the pH of the pulp. The paper maker could therefore end up with a too low pH in the short circulation or in the stock preparation which may lead to dissolution of calcium carbonate used as a filler and/or pigment and to foaming problems due to a decomposition of dissolving calcium carbonate. One might be once again forced to adjust pH using NaOH. The pH may also change at refining or in storage towers due to microbiological growth.

When pulp is bleached using dithionite, dithionite may cause problems when it oxidizes. Sulfuric acid is formed in the paper machine circulations causing pH to decrease in water and pulp.

In water treatment processes a substantial alkalinity would be advantageous in processing both fresh water and wastewater. In treatment of drinking water sufficient alkalinity would assure e.g. that the pH does not vary too much in the water distribution system. Too big fluctuations in pH may cause e.g. corrosion in the pipes because of the variation in the reduction oxidation condition. The inherent hardness of natural waters also causes problems in the processing.

In wastewater treatments the alkalinity and the pH of the water are important for biological activity. Sufficient alkalinity would ensure that there is not too much fluctuation in the pH. The pH should not vary too much and it should stay suitable for biological activity in order for the bioprocess to proceed properly.

In the prior art one way of avoiding too big pH fluctuations in industrial processes has been to add dissolved sodium bicarbonate, $NaHCO_3$, to the process. The $NaHCO_3$ dissociates in the aqueous media forming bicarbonate ions, $HCO_3^-$, which have a buffering capacity and therefore counteract any pH change. $NaHCO_3$ is a solid powder, which is generally supplied in so called big-bags, and the mill needs space for handling, equipment for dissolving and tanks for storage. The $NaHCO_3$ is messy to work with, when in contact with moisture or water.

According to WO 98/56988 the pH of a pulp suspension in the stock preparation of a paper machine is stabilized by increasing the bicarbonate alkalinity of the suspension. A combination of sodium hydroxide and carbon dioxide provides a significant buffering effect in the pulp. There may, however, appear some difficulties in the addition of the sodium hydroxide and carbon dioxide according to the invention. A local high pH caused by the addition of the sodium hydroxide may cause precipitation of calcium carbonate. A high pH may dissolve extractives, which may then precipitate elsewhere in the process. A high pH may also cause yellowing of the pulp. It may also be difficult to add sufficiently carbon dioxide to the process.

In the prior art the addition of the basic and acidic substances needed in the industrial process is usually done separately in special dosing points. The use of basic and acidic substances often requires preprocessing, e.g. dissolving and diluting, and special equipment for that before the substances are fed into the industrial process. The selection of the dosing points depends on the industrial process and the chemicals in question. The dosing points of e.g. gaseous substances must be carefully selected to have a suitable pressure, temperature and pulp consistency. It may not even be possible to feed gaseous substances in the needed points of the industrial process, or it may require complex equipment.

The amounts of the basic and acidic substances needed have to be measured and determined separately for each industrial process because of varying process conditions. In case strong acid and bases are used, the amounts added have to be measured especially carefully in order to avoid too big pH changes caused by over dosages. Diluted substances are easier to add but dilution itself requires extra work.

It could often be important that acidic or basic chemicals needed in the industrial process could be added without affecting the pH of the system.

Thus, there exists a need for a simple and secure way to add acidic and basic substances into industrial processes for controlling the alkalinity, pH and/or hardness of a liquid in an industrial process.

An object of the present invention is to provide an apparatus which can be easily connected to an industrial process in order to add basic and acidic substances into the industrial process for controlling the alkalinity and pH at desired points. Another object of the invention is to provide an apparatus which enables automatic and precise feeding of the acidic and basic substances to a liquid of the industrial process.

Another object of the invention is to provide a method of controlling alkalinity and pH of an industrial process.

A further object of the invention is to provide a method of controlling the hardness of water in an industrial process.

The invention according to the present application is defined in the appended claims, the contents of which are included herein by reference.

Consequently, the present invention relates to an apparatus and a method for controlling the alkalinity of an industrial process by feeding and mixing automatically water as well as basic and acidic substance into the process.

The present invention relates to an apparatus for controlling the alkalinity and the pH of a liquid of an industrial process, wherein the apparatus is adapted for being located outside a main process stream of an industrial process. The apparatus includes inlet means for a basic substance, an acidic substance and water, control means for the inlet means and a reactor for reacting the basic substance, the acidic substance and the water. The reactor provides a predefined alkalinity and pH in the resulting aqueous buffering mixture. The apparatus also includes outlet means for supplying the buffering mixture to the main process stream for controlling the alkalinity and the pH of the industrial process.

The present invention relates also to a method for controlling the alkalinity of a liquid of an industrial process. The method comprises the steps of providing a basic and an acidic substance which substances in combination are capable of forming buffering ions in an aqueous medium; introducing controlled feeds of the basic and the acidic substances as well as water into the reactor of an apparatus located outside a main process stream of the industrial process; causing the basic substance, the acidic substance and the water to react so as to provide a predefined alkalinity in the resulting aqueous buffering mixture; and supplying the aqueous buffering mixture to the main process stream for controlling the alkalinity of the industrial process.

The apparatus according to the invention enables very accurate alkalinity control. It also enables an accurate pH control. The invention further enables controlling of the hardness of any aqueous vehicle of the industrial process. The apparatus is easy to install in any necessary dosing points in an industrial process since there is no need for feeding acid and base directly to the process. The addition of acidic and basic substances occurs outside the main process in the inventive apparatus automatically and safely without messy handling or risky reaction between the substances. The location of the apparatus and the dosing points of the prepared buffering mixture may be freely determined depending on the industrial process in question.

An apparatus according to the present invention can be designed in many ways to best suit the industrial process in question. The structure may be designed depending on the industrial process where it is used as well as taking into account the substances used in the apparatus for preparing the buffering mixture.

The apparatus according to the present invention comprises a reactor which may be either a continuous reactor or a batch reactor. A continuous reactor enables a continuous control of the alkalinity in the industrial process. In case changes happen in the alkalinity or process conditions, adjustments may be done automatically and without delay. A batch type reactor apparatus may be operated when there is need for adjusting the alkalinity e.g. due to special process conditions or raw materials. A batch type reactor may also feed the buffering mixture to a tank where the buffering mixture is continuously and/or intermittently fed to the industrial process.

The invention will now be described in greater detail with reference to the drawings, wherein:

FIG. 1 discloses a preferred embodiment of an apparatus according to the present invention.

Figure 2:
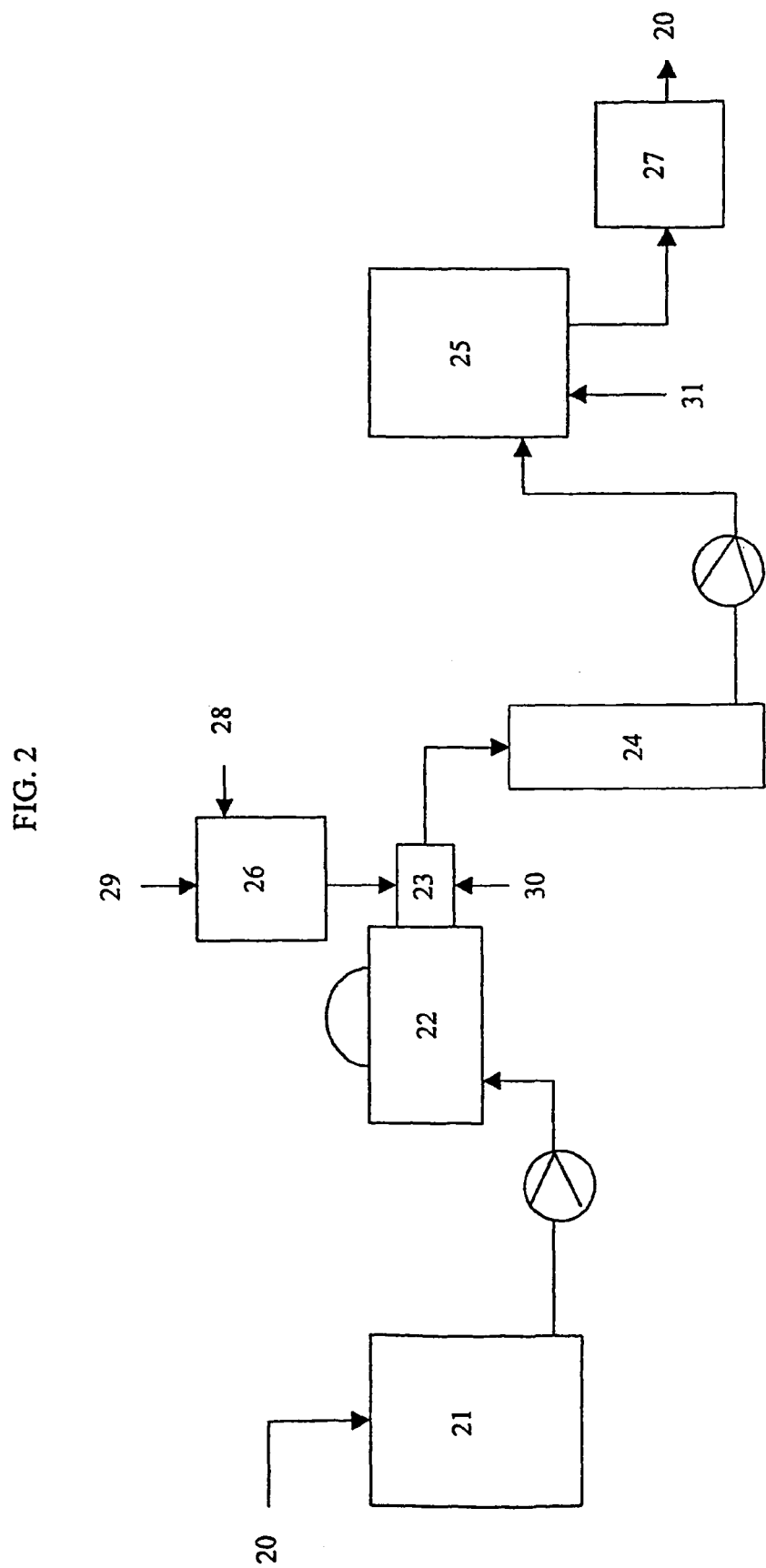

FIG. 2 presents a schematic drawing of a papermaking process having installed an apparatus according to the present invention.

In the preferred embodiment the apparatus shown in FIG. 1 has a reactor designed as a tube reactor 1 having one bend 11. The apparatus comprises inlets means 2, 3, 4 for the basic and the acidic substance and the water, respectively. The inlet for the acidic substance comprises a smaller perforated tube 5 located inside the tube reactor 1. The perforated tube 5 has several inlet openings 7. The inlet means 2, 3, 4 have each separate control means 6. The control means 6 are individually regulated by a control device (not shown) which is preferably connected to a computer which regulates the main process. The apparatus comprises also a temperature controlling and monitoring means 8, a static mixer 10 and means for taking samples 12 as well as outlet means 9.

The length of the tube reactor 1 is adjusted depending on the industrial process where it is installed. It is important that the tube reactor 1 has a length which is sufficient to allow the reaction between the substances to take place under controlled conditions. The number of the bends 11 as well as the shape and the size of the tube reactor 1 is adjusted depending on the length of the reactor 1 and the space in the location where it is installed.

The inlet means 2, 3, 4 of the apparatus comprise conventional means used in industrial processes such as valves. The inlet means for the basic and/or the acidic substance preferably also includes means (not shown) for diluting and/or dissolving the substance in water to provide a controlled aqueous solution of said substance. This means that even concentrated acids and bases or solid substances are preferably used in the apparatus without any preprocessing outside the apparatus. The dilution of a concentrated substance to an appropriate concentration or the dissolving of a solid substance preferably occurs in the corresponding inlet means of the apparatus. In such cases no separate stages for dilution and dissolving are needed.

The inlet means 2, 3 for the basic and acidic substance, respectively, may also comprise an inlet for a gas which is capable of forming a base or an acid in an aqueous medium. Such an inlet is provided e.g. by the perforated tube 5 in FIG. 1 inside the tube reactor 1. The perforated tube 5 feeds the acidic substance to the reactor 1 through a large number of steps continuously and gradually and assures a safe addition of the acidic substance.

The inlet means 4 for water is an inlet for water to be used in the apparatus. The inlet means for water need not be separately provided, but it may instead be combined with the inlet means for the basic and/or acidic substance. In such a case, the water is fed into the apparatus from the same point as the basic or the acidic substance. The apparatus may also comprise separate vessels for pre-combining said basic and/or acidic substance with water. The obtained diluted mixture is then combined with the other substance in the reactor.

In a preferred embodiment of the invention the apparatus has several, more preferably two or more inlets for said basic and/or acidic substance and/or water. Addition of some acidic substances such as carbon dioxide through 3 to 10 steps is preferred. In a tube reactor type apparatus the inlets are preferably spaced apart along the tube reactor. This enables addition of the substances so that there is enough time for the reaction between the added substances to take place before more substance is fed into the reactor.

In the preferred embodiment according to FIG. 1 perforated tube 5, which is located inside the tube reactor 1, provides several inlets. Several openings 7 of the perforated tube 5 assure continuous and gradual addition of the acidic substance into the reactor 1. The length of the perforated tube 5 in relation to the whole tube reactor 1 as well as the number of the openings 7 is adjusted according to the amount and flow rate of the acidic substance. The perforated tube 5 is preferably used as an inlet for a gaseous substance such as carbon dioxide. The openings 7 at the distant end of the tube 5 may be larger than at the inlet end in order to compensate for a pressure drop in the tube.

The basic and acidic substance feeds and the water feed into the apparatus are controlled by the control means 6 for the inlet means 2, 3, 4. The control means 6 are indicated by boxes in FIG. 1. The control means 6 comprise means for monitoring and adjusting the flow rate of the basic and acidic substances needed in the reaction. The flow is controlled to ensure accurate dosing of the substances. By controlling the amount of the basic and acidic substances fed into the reactor the chemical equilibrium of the reaction is controlled accurately and a predefined alkalinity and pH is obtained in the resulting aqueous buffering mixture. Also the concentrations of the substances needed in the process are preferably controlled and monitored. This way it is possible to avoid failures due to false amounts and concentrations in the apparatus.

The control means 8 indicated by a box in the reactor 1 are designed for controlling the reaction conditions and concentration of substances in the apparatus. The controlling of the apparatus also ensures steady and safe operation of the apparatus. The control means 8 may comprise any conventional means for measuring and analyzing the necessary parameters such as temperature. The control means 8 may also include alarm systems for unusual situations.

The outlet means 9 of the apparatus comprise conventional means used in industrial processes. The outlet means 9 enable supplying the buffering mixture prepared in the apparatus to the industrial process.

In order to ensure proper mixing of the substances in the apparatus it advantageously comprises means 10 for spraying and/or agitation. The mixers are preferably static mixers 10 such as those disclosed in FIG. 1. The mixing in the apparatus is preferably automatic and constant, although it may be separately controlled and monitored.

The apparatus preferably also comprises means for cooling the walls of said reactor in order to keep substances such as calcium carbonate from precipitating on the walls. The controls means of the apparatus may also comprise means for removal of precipitated matter.

An alkalinity apparatus according to the present invention is preferably connected to a control and monitoring system of the industrial process or of the main process stream. Thus, the functioning of the apparatus is controlled and monitored simultaneously with the main process. The personnel running the apparatus according to the present invention does not have to monitor the apparatus separately as it functions as a part of the main process. In cases where dilution is provided in the apparatus, basic and acidic substances may be used in the apparatus without any preprocessing.

In a preferred embodiment of the invention the apparatus is computer controlled in order to ensure the operation of the apparatus to take place in a controlled manner.

The apparatus according to the invention may be used in any industrial process where there exists need for controlling alkalinity. The apparatus may be designed according to the requirements of each industrial process. The apparatus may be used e.g. in various points in a process for making paper or pulp, such as in the stock preparation, in water circulations, in a filter between a pulp mill and a paper mill or in the broke storage tank. It is also possible to use the apparatus according to the invention in a water treatment process. The apparatus is useful both in wastewater and fresh water treatments.

FIG. 2 discloses a papermaking process wherein the apparatus 26 according to the present invention is connected to a dilution screw 23 after a filter 22. The functioning of the apparatus in this kind of a case is explained in greater detail in Example 1.

A person skilled in the art is able to calculate the amount of alkalinity needed in an industrial process in order to maintain a sufficient buffering capacity during the process. The amount of alkalinity needed depends e.g. on the amount and type of chemicals fed into the industrial process, raw material flows, filler and pulp amount.

The term "main process stream" as used in the present specification and claims basically means the flow of combined raw materials from start to finish of an industrial process. However, a main process stream may also denote a stream of raw materials other than those providing the inventive alkalinity, or it may denote loops and recirculations of process fluids such as circulations of process water at various points of the industrial process. The industrial process may operate in a continuous or batch type operation, although a continuous operation is preferred.

The main process stream according to the invention is preferably an aqueous stream in an industrial process where raw material(s) flow from start to finish. The main process stream may also be a stream which leads to or is separated from the raw material flow. It may be e.g. an aqueous pulp suspension in a fiber plant or in a paper machine or a water stream leading to and/or separated from said suspension. The main process stream may also be a pulp suspension after a bleaching stage, in a stock preparation, in a long circulation or in a short circulation. It may comprise wash water recirculations or fresh water lines. The main process stream may also be a stream in a water or wastewater treatment process.

The terms "stock preparation", "long circulation" and "short circulation" in the present description have the meanings defined in Papermaking Science and Technology: Book 8, Papermaking Part 1, Stock Preparation and Wet End, ed. Hannu Paulapuro, Fapet Oy, 2000 p. 125.

A basic substance according to the invention is a substance which acts as a base in the surroundings of the process in question. The basic substance may be added in a solid, liquid or gaseous form and it may be dissolved or diluted in the apparatus. A preferred basic substance is an alkali metal hydroxide, alkali metal carbonate, alkali metal bicarbonate, alkali metal phospate, alkali metal biphosphate and/or alkali metal phosphite. A preferred basic substance is liquid or solid sodium hydroxide, sodium carbonate, sodium bicarbonate, sodium phosphate, calcium hydroxide, potassium hydroxide or green liquor or white liquor of a wood digestion process.

An acidic substance is a substance which acts as an acid in the surroundings of the process in question. The acidic substance may also be a gas providing an acid in an aqueous medium. This means that it is a gaseous substance which forms an acid in aqueous medium, e.g. gaseous carbon dioxide or sulfur dioxide. Carbon dioxide is a gas, which easily dissolves under alkaline conditions, e.g. in water or in a pulp suspension forming carbonic acid and/or bicarbonate ions according to the reaction: $CO_2 + H_2O \Leftrightarrow H_2CO_3 \Leftrightarrow H^+ + HCO_3^-$. At a high pH, especially greater than 10, the predominant reaction is $CO_2 + 2OH^- \Leftrightarrow CO_3^{2-} + H_2O$.

An aqueous solution of an acidic substance can also be called an aqueous acid. Thus carbon dioxide is an acidic substance which forms an aqueous acid. The acidic substance may also be an organic or inorganic acid, preferably selected from sulfurous acid, alun, phosphoric acid, carbonic acid, citric acid and hydrochloric acid.

In case sodium hydroxide or potassium hydroxide is used, a preferred acidic substance is carbon dioxide, sulfur dioxide, sulfurous acid, carbonic acid or phosphoric acid. The most preferred combination is sodium hydroxide and carbon dioxide. Preferable combinations of the basic and the acidic substance are e.g. a salt of carbonate or a phosphate and a strong acid, such as hydrochloric acid or alun.

A controlled aqueous solution of a basic and/or and acidic substance means a solution of the corresponding substance that has a specific concentration. The solution may be prepared in advance separately from a concentrated or solid substance and then fed into the apparatus. However, one advantage of the apparatus is that the controlled aqueous solution can also be made automatically in the apparatus. For example in case NaOH is used as the basic substance the apparatus preferably comprises means for diluting NaOH which has an initial concentration e.g. of about 30% to provide a NaOH solution having a concentration of 1–9 w-%, preferably about 6%.

The water used in the apparatus may comprise raw water or water separated from said main process stream of the industrial process. The water may be derived e.g. from a water stream leading to and/or separated from a pulp suspension or papermaking stock. The water may also comprise diluted pulp suspension separated from said main process. The water may also be drinking water to be treated in a water treatment process. The alkalinity of drinking water is preferably raised just before the water is supplied to the water distribution system. The alkalinity of wastewater is preferably controlled during the wastewater treatment.

The present invention provides an aqueous buffering mixture for use in an industrial process. The mixture prepared in the apparatus in the reaction between the basic substance and the acidic substance which substances in combination are capable of forming buffering ions influencing the alkalinity of an aqueous medium. The resulting aqueous buffering mixture has a predefined alkalinity which depends on the alkalinity needed in the industrial process in question. The aqueous buffering mixture is capable of providing an elevated alkalinity in the industrial process when it is supplied thereto.

The buffering mixture of the invention is formed from the basic substance, acidic substance and the water which are introduced in a controlled way into the apparatus. The basic substance and the acidic substance react in the water in the apparatus providing a predefined alkalinity in the resulting aqueous buffering mixture. The control means of the apparatus assure that the buffering mixture has a desired alkalinity and pH. The concentration of the basic substance is preferably controlled and monitored by measuring e.g. the density of the basic substance. The amount of the acidic substance fed into the reactor is then adjusted to obtain a desired alkalinity and pH in the resulting buffering mixture. The resulting aqueous buffering mixture is supplied to the main process stream of the industrial process for controlling the alkalinity and the pH of said industrial process.

The pH in the reactor is preferably also controlled and monitored. The pH of the resulting aqueous buffering mixture is controlled according to the needs of the industrial process. In a paper or pulp making process a preferred pH may be e.g. about 6 to 10. Also the carbonate ion concentration, bicarbonate ion concentration and/or total alkalinity or M-alkalinity may be monitored in the apparatus. Thus the alkalinity of the resulting aqueous buffering mixture is adjusted to a specific predetermined value in the apparatus. The resulting aqueous buffering mixture is supplied into the industrial process to control the alkalinity of the main process stream.

The temperature and the pressure in the reactor are preferably controlled and monitored in the apparatus in order to keep the conditions suitable for the reactions between the water and the basic and the acidic substance. The temperature is preferably controlled because the reactions may be highly exothermic. Too high a temperature may cause an increase in the pressure or even an explosion.

Mixing of the substances is preferably provided to ensure proper and safe reacting of the substances. In a multi-stage reaction where acid or base is gradually added, the previous reaction should be completed before any new substance is added. The apparatus may comprise means for quick closing of the inlets in case e.g. the temperature or the pressure becomes too high in the reactor.

In some cases the water used in the reaction contains free calcium ions. Free calcium ions may cause problems in many processes e.g. when they precipitate with other compounds in the process. Calcium ions may lead e.g. to unwanted scaling on the walls. In a preferred embodiment of the invention it is possible to keep calcium carbonate from precipitating on the walls of the reactor by cooling the walls of said reactor. Any precipitated calcium carbonate will thus remain in the solution and will be fed as solid particles to the main process with the buffering mixture or, alternatively it may be removed from the mixture. In case the hardness of water is high the water can be treated in order to reduce the hardness and the amount of calcium ions. The water can be treated e.g. magnetically or by precipitation. Such methods are available commercially.

In a papermaking process it might be advantageous that any calcium ions precipitate in the apparatus. Especially when the basic substance comprises NaOH which is contacted with calcium ions in the water, the subsequent feeding of $CO_2$ as the acidic substance will precipitate the calcium ions as calcium carbonate. The precipitated calcium carbonate will be fed to the papermaking process and will attach to the fibers in the pulp suspension and be removed from the circulating water.

In a preferred embodiment of the invention the apparatus is used for controlling the alkalinity using sodium hydroxide as the basic substance and carbon dioxide as the acidic substance. The sodium hydroxide fed into the apparatus can also be concentrated The sodium hydroxide may at need be diluted in the apparatus prior to introduction into said reactor. A preferred concentration after dilution is about 1 to 9%, more preferably NaOH is diluted to a concentration of about 6%. The dilution of the sodium hydroxide may be performed in the inlet end of the reactor at a point prior to the introduction of the carbon dioxide, or the sodium hydroxide may be separately pre-diluted In a preferred embodiment carbon dioxide is introduced in at least two separate steps, preferably in 2 to 10 separate steps. In case a tube reactor is used carbon dioxide is preferably introduced in a tube reactor gradually e.g. through a perforated tube located inside the tube reactor.

The invention is now illustrated in a few examples which do not limit the invention in any way. A person skilled in the art will be able to use the apparatus in many different ways.

EXAMPLE 1

An apparatus according to the present invention was tested in a paper mill having the process characteristics shown in FIG. 2. The apparatus 26 of the present invention was a tube reactor located outside the main process 20 of the paper mill as disclosed in FIG. 2. The apparatus 26 was connected to the controlling and monitoring system of the paper mill.

The apparatus 26 was used for preparing a buffering mixture containing sodium and bicarbonate ions by absorbing gaseous carbon dioxide 28 into a diluted aqueous solution 29 of sodium hydroxide (about 2%). The pH of the mixture was about 8.0. The alkalinity of the mixture was about 500 mmol $CaCO_3$/l.

A pulp suspension 20 comprising a birch line and having a pH of 5.0 was pumped from a pulp mill storage tower 21 to a filter 22 in the paper mill. The consistency of the pulp suspension after the filter was about 30%. The buffering mixture prepared in the apparatus 26 was supplied into the pulp suspension at a dilution screw 23 after the filter 22 in an amount of 6 kg/1000 kg mass (dry weight basis). The pulp suspension was diluted at the same time to a consistency of about 10% using water 30 in addition to the buffering mixture. The resulting pulp suspension was pumped through a drop pipe 24 to a paper mill storage tower 25. The pH in the tower was about 7.2 and the alkalinity was 7 to 8 mmol $CaCO_3$/l.

The pulp was picked up from the storage tower 25 to the papermaking process 27 with a $CaCO_3$-containing white water 31 from the subsequent paper machine which operated at a pH of 8.0. Since the pH of the pulp suspension had been raised by the buffering mixture to 7.5 and because of the increased alkalinity of the pulp suspension, the $CaCO_3$ in the white water remained in solid form in the resulting diluted suspension. In case no buffering mixture had been used, the $CaCO_3$ would have dissolved in consequence of the pH variation which would have taken place when the pulp suspension at pH 5.0 met the white water at pH 8.0. As a consequence of the feeding of the buffering mixture to the process at the screw 23, the whole of the subsequent papermaking process became stabilized and the M-alkalinity of the white water was raised from 2.6 mmol $CaCO_3$/l to 4.5 mmol $CaCO_3$/l. The hardness of the white water decreased about 30% from 65 Ca mg/l to 28 Ca mg/l.

The above mentioned procedure was also applied to a pine line in the same paper mill. The procedure was the same expect that the buffering mixture was supplied to the drop pipe 24 distribution ring. Similar advantageous results were obtained as when used in the birch line.

EXAMPLE 2

An apparatus according to the invention was tested in preventing pH changes in a broke storage tower caused by the organic acids formed in consequence of the microbiological activity.

Broke from several places in a paper making process were collected in a storage tower. An apparatus according to the invention was connected to a recycling pipe used in the storage tower to help homogenize the broke in the tower. A buffering solution having a pH 7.5 was intermittently supplied in an amount of 5 kg $NaHCO_3$/1000 kg mass (dry weight basis) to the recycling tower. The pH of the broke remained steady and no decrease in pH was observed despite microbiological activity.

EXAMPLE 3

Water in a water supply system had a low alkalinity (0.2 mmol $CaCO_3$/l). The low alkalinity caused pH fluctuations in the supply system and this, in turn, caused corrosion problems in the pipes.

The alkalinity of the water was raised with the apparatus according to the invention using NaOH and $CO_2$ to a value of 1.0 mmol $CaCO_3$/l.

The pH of the buffered water remained constant at 7.0 and no corrosion problems occurred in the pipes.

It is evident that the invention may be varied in a great number of ways which are obvious to those skilled in the art without deviating from the scope of the claims.

The invention claimed is:

1. An apparatus for controlling the alkalinity, pH or hardness of a main aqueous process stream of an industrial process, the apparatus being adapted for being located outside the main process stream of said industrial process, said apparatus including inlet means (2, 3, 4) for a basic substance, an acidic substance and water, control means (6) for said inlet means (2, 3, 4), for controlling the feeding of the basic substance, the acidic substance and the water, a reactor (1) for reacting said basic substance, said acidic substance and said water for providing a predefined alkalinity and/or pH in a resulting aqueous buffering mixture, and outlet means (9) connected during use to the main process stream for supplying said buffering mixture to said main process stream for controlling said industrial process.

2. An apparatus according to claim 1, wherein said industrial process is a process for making paper or pulp or a water treatment process for fresh water or waste water.

3. An apparatus according to claim 1, wherein said apparatus is connected to a control and monitoring system of said industrial process or said main process stream.

4. An apparatus according to claim 1, wherein
said inlet means (2) for a basic substance comprises an inlet for solid or liquid base selected from the group consisting of sodium hydroxide, sodium carbonate, sodium bicarbonate, sodium phosphate, calcium hydroxide, potassium hydroxide and green liquor or white liquor; and
said inlet means (3) for an acidic substance comprise an inlet for gaseous carbon dioxide or sulfur dioxide or for a liquid organic or inorganic acid, selected from the group consisting of sulfurous acid, alum, phosphoric acid, carbonic acid, and hydrochloric acid.

5. An apparatus according to claim 1, wherein said inlet means (2, 3) include means for diluting and/or dissolving the basic and/or acidic substance in water to provide a controlled aqueous solution of said basic and/or acidic substance.

6. An apparatus according to claim 1, wherein said inlet means (3) for an acidic substance comprise an inlet (5) for liquid acid or for a gas which is capable of forming an acid in an aqueous medium.

7. An apparatus according to claim 6, wherein said inlet means (2) for a basic substance comprise an inlet for diluted sodium hydroxide and said inlet means (3) for an acidic substance comprise an inlet (5, 7) for gaseous carbon dioxide.

8. An apparatus according to claim 1, wherein said inlet means for water (4) comprise an inlet for water or a dilute pulp suspension separated from said main process stream.

9. An apparatus according to claim 1, wherein said inlet for water is combined with said inlet (2, 3) for a basic substance and/or said inlet for an acidic substance.

10. An apparatus according to claim 1, wherein said inlet control means (6) comprise means for monitoring and adjusting the flow and/or concentration of said basic and acidic substances and the flow of the water in order to provide said predefined alkalinity.

11. An apparatus according to claim 1, wherein said apparatus comprises a continuous reactor or a batch reactor.

12. An apparatus according to claim 1, wherein said reactor comprises a tube reactor (1) having a length which is sufficient to allow the reaction between said substances to react in a controlled manner.

13. An apparatus according to claim 12, wherein said tube reactor (1) comprises several inlets for said basic and/or acidic substance and/or water.

14. An apparatus according to claim 12, wherein said tube reactor (1) includes two or more inlets (7) for said acidic substance said inlets being spaced apart along the tube reactor.

15. An apparatus according to claim 1, wherein said reactor comprises control means (8) for controlling a parameter selected from temperature, pressure, flow amount and velocity, mixing and pH.

16. An apparatus according to claim 15, wherein said reactor control means (8) comprise means for cooling the walls of said reactor in order to keep calcium carbonate from precipitating on the walls.

17. An apparatus according to claim 1, wherein said reactor comprises control means (8) for removal of precipitated matter.

18. An apparatus according to claim 1, wherein said apparatus is adapted for being located outside and connected to a stock preparation, a water circulation line, a short circulation, a filter between a pulp mill and a paper mill, a broke storage tank and/or a clear filtrate line in a papermaking process.

19. An apparatus according to claim 1 wherein said apparatus comprises a tank for said buffering mixture.

20. The apparatus of claim 1, further comprising a tank for holding said buffering mixture, said tank being located optionally up stream of said outlet means (9).

21. A method for controlling the alkalinity, pH or hardness of an industrial process, said method comprising
providing a basic and an acidic substance which substances in combination are capable of forming buffering ions which influence the alkalinity of an aqueous medium;
introducing controlled feeds of said basic and said acidic substances as well as water into a reactor of an apparatus located outside a main process stream of said industrial process;
causing said basic substance and said acidic substance to react in said water to provide a predefined alkalinity and/or pH in the resulting aqueous buffering mixture;
supplying said aqueous buffering mixture to said main process stream for controlling the industrial process.

22. A method according claim 21, wherein said industrial process is a process for making paper or pulp or a water or a waste water treatment process.

23. A method according claim 21, wherein said main process stream comprises an aqueous pulp suspension in a papermaking process or a water stream leading to and/or separated from said suspension.

24. A method according claim 21, wherein
said basic substance comprises an alkali metal hydroxide, an alkali metal carbonate, an alkali metal bicarbonate, an alkali metal phosphate, an alkali metal biphosphate and/or an alkali metal phosphite and/or green liquor or white liquor, and that
said acidic substance comprises gaseous carbon dioxide or sulfur dioxide or a liquid organic or inorganic acid selected from the group consisting of sulfurous acid, alum, phosphoric acid, carbonic acid and hydrochloric acid.

25. A method according claim 21, wherein said carbon dioxide is introduced in a tube reactor in at least two separate steps.

26. A method according claim 21, wherein said water comprises process water separated from said main process stream and/or water leading to said main process stream.

27. A method according claim 21, wherein said water contains calcium ions, and the walls of said reactor are cooled in order to keep calcium carbonate from precipitating on the walls, and in that any precipitated matter is optionally removed from the buffering mixture prior to supplying the same to said main process stream.

28. A method according claim 21, wherein the temperature, pressure, mixing and/or pH of said reaction and/or the flow of said substances is monitored.

29. A method according claim 21, wherein the pH of said aqueous buffering mixture is controlled to about 6 to 10.

30. A method according to claim 21, wherein said water is treated in order to reduce the hardness of water.

31. A method according to claim 30, wherein said water is treated magnetically or by precipitation.

32. A method according to claim 22, wherein said industrial process is controlled so as to retain calcium carbonate in solid form.

33. The method of claim 25 wherein said carbondioxide is introduced into the tube reactor in more than two steps.

34. The method of claim 25 wherein the carbondioxide is introduced into the tube reactor through at least three to ten steps.

35. The method of claim 21 wherein said main process stream contains calcium carbonate, and the industrial process is controlled so as to retain calcium carbonate in solid form.

36. A method for controlling the alkalinity, pH and/or hardness of an industrial process, said method comprising providing a basic substance and an acidic substance, which substances in combination are capable of forming buffering ions which influence the alkalinity of an aqueous medium;

introducing controlled feeds of said basic substance and said acidic substance as well as water into a reactor of an apparatus located outside a main process stream of said industrial process;

causing said basic substance and said acidic substance to react in said water to provide a predefined alkalinity and/or pH in the resulting aqueous buffering mixture; and supplying said aqueous buffering mixture to said main process stream for controlling the industrial process;

wherein said basic substance comprises sodium hydroxide and said acidic substance comprises carbon dioxide.

* * * * *